Figure 1:
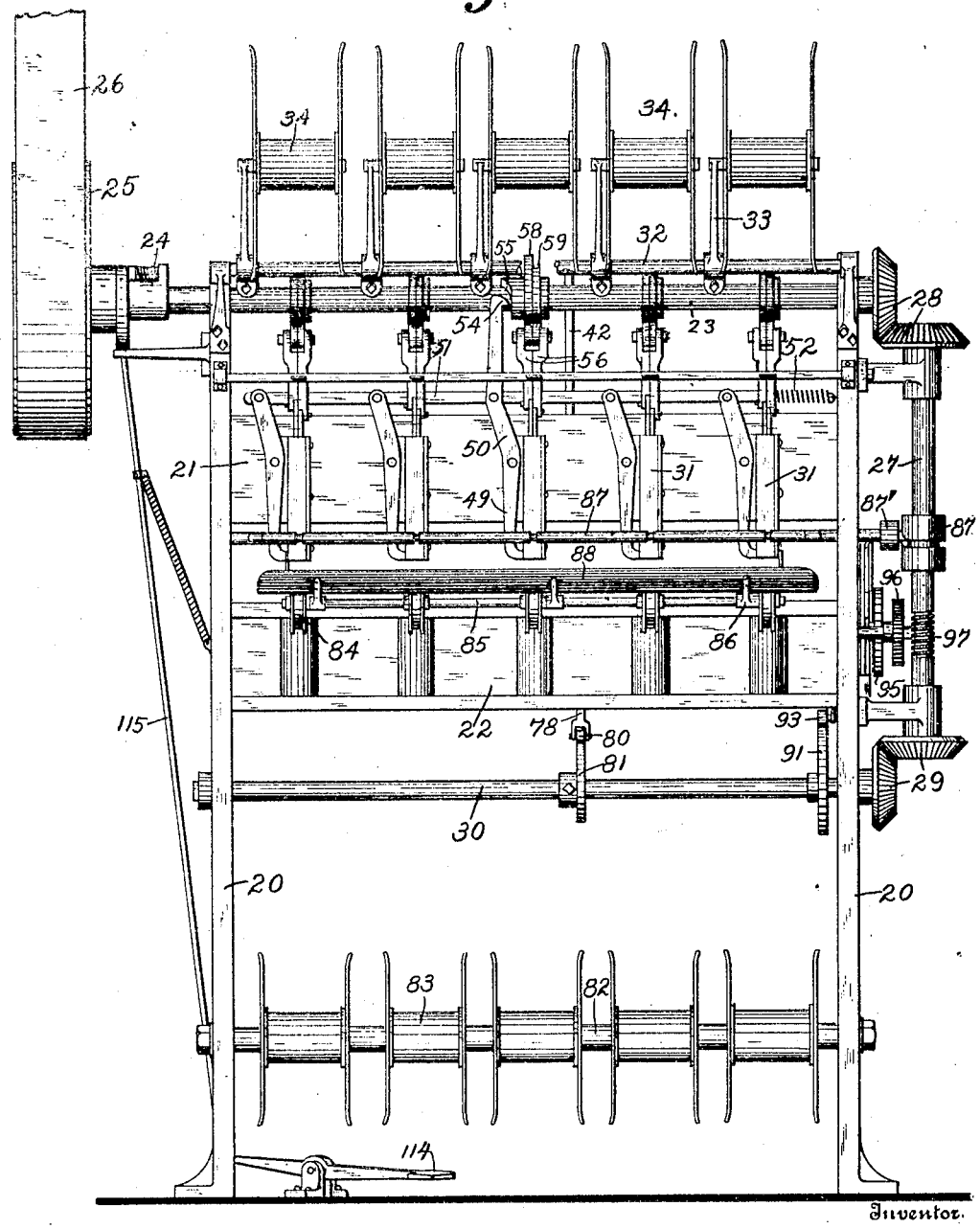

No. 892,827. PATENTED JULY 7, 1908.
J. GRAVES.
FLY NET MACHINE.
APPLICATION FILED OCT. 8, 1906.

7 SHEETS—SHEET 1.

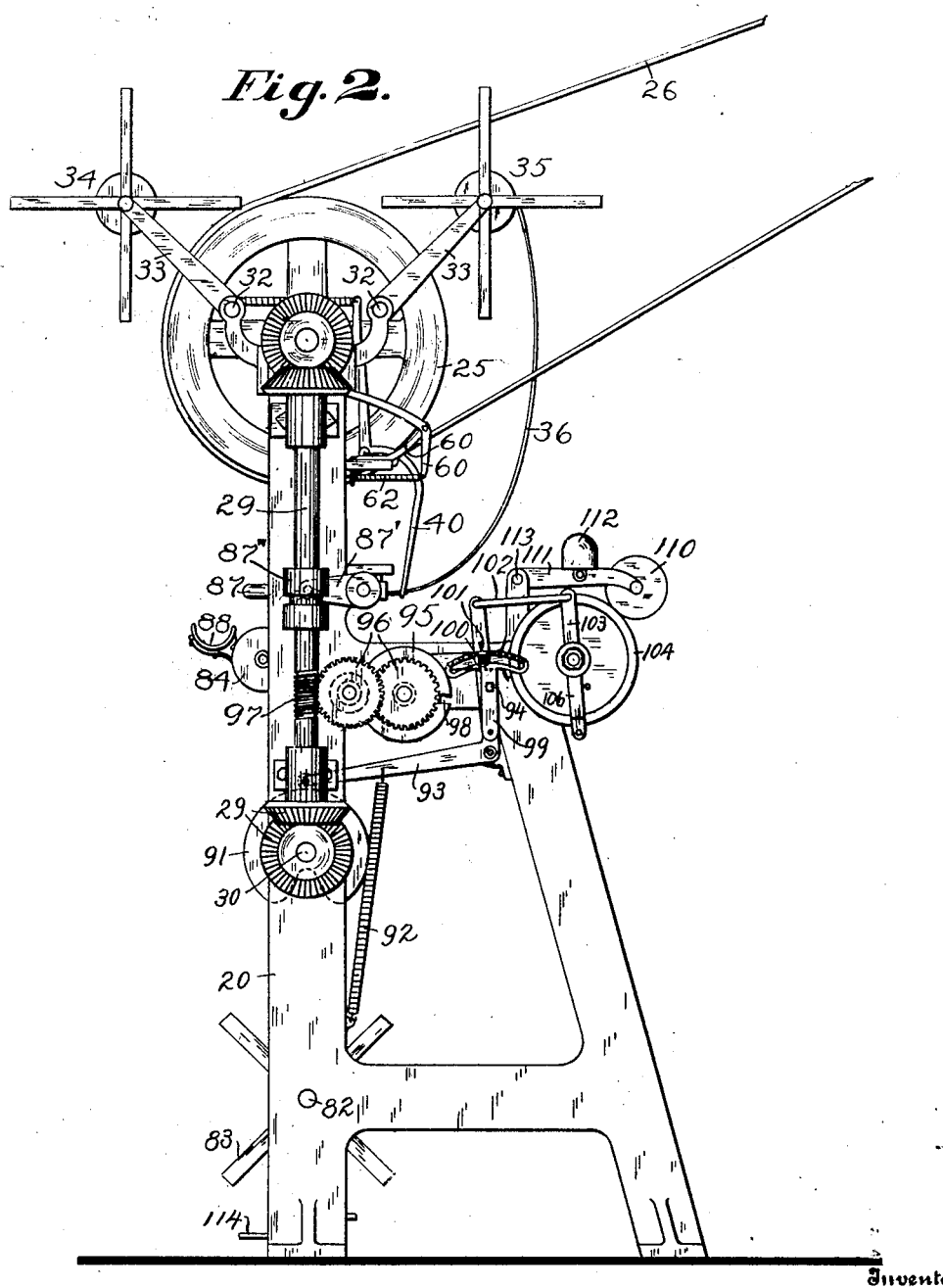

No. 892,827. PATENTED JULY 7, 1908.
J. GRAVES.
FLY NET MACHINE.
APPLICATION FILED OCT. 8, 1906.
7 SHEETS—SHEET 3.
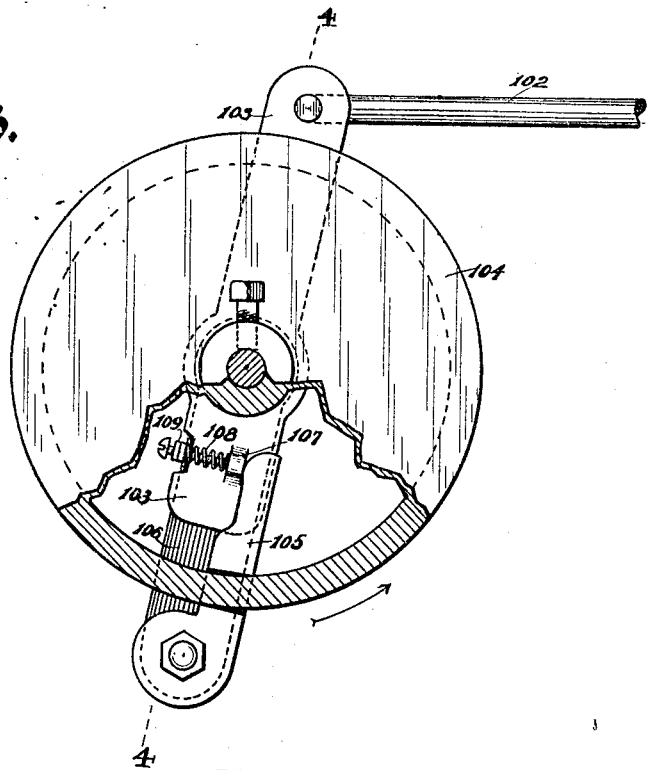
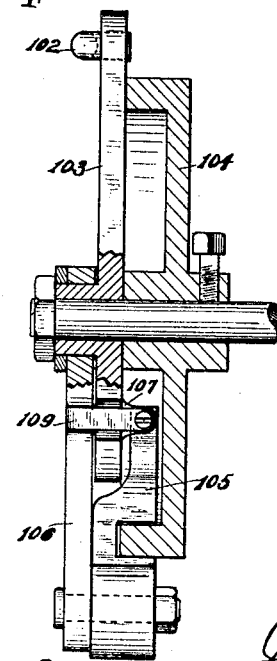
Witnesses.
C. H. Koney
Anna F. Schmidtbauer
Inventor.
John Graves
By Benedict, Morsell & Caldwell
Attorneys.

No. 892,827.  PATENTED JULY 7, 1908.
J. GRAVES.
FLY NET MACHINE.
APPLICATION FILED OCT. 8, 1906.
7 SHEETS—SHEET 4.
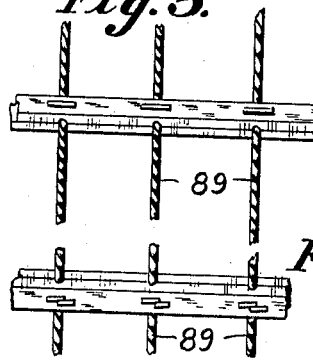
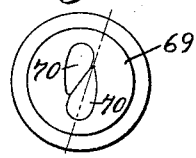
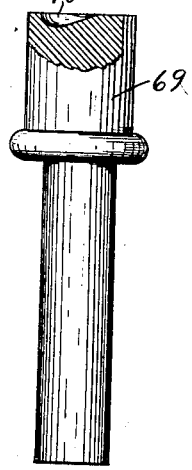
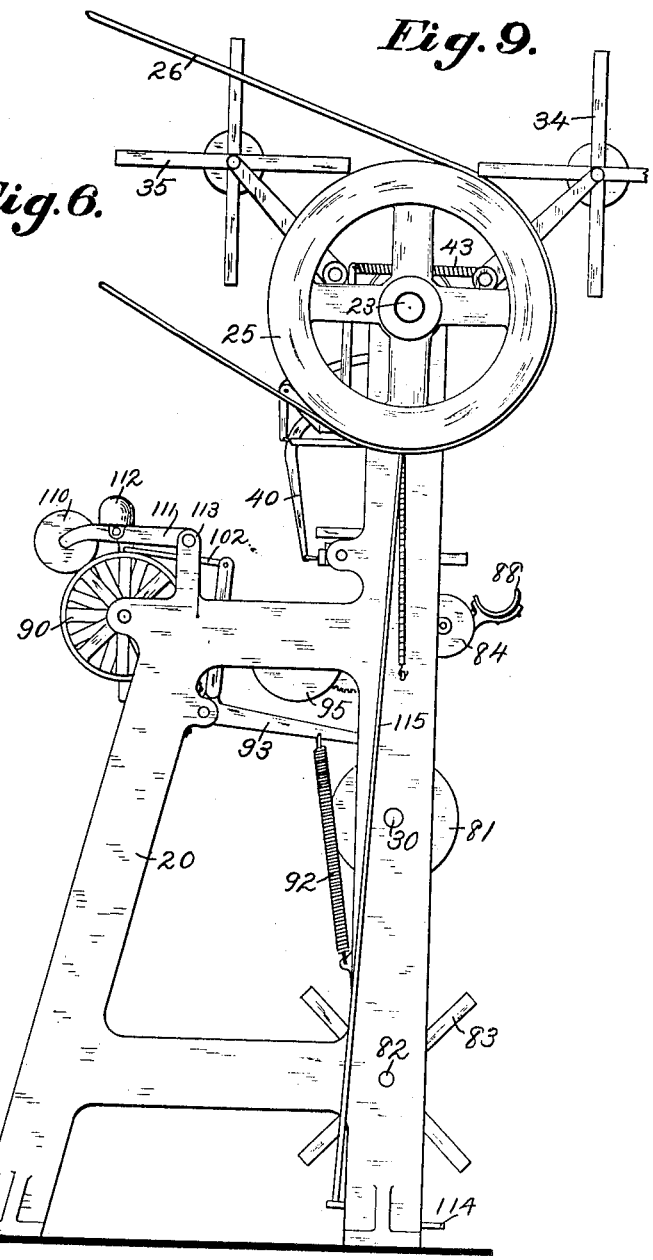
Witnesses
Inventor John Graves
By Benedict, Morsell & Caldwell
Attorneys

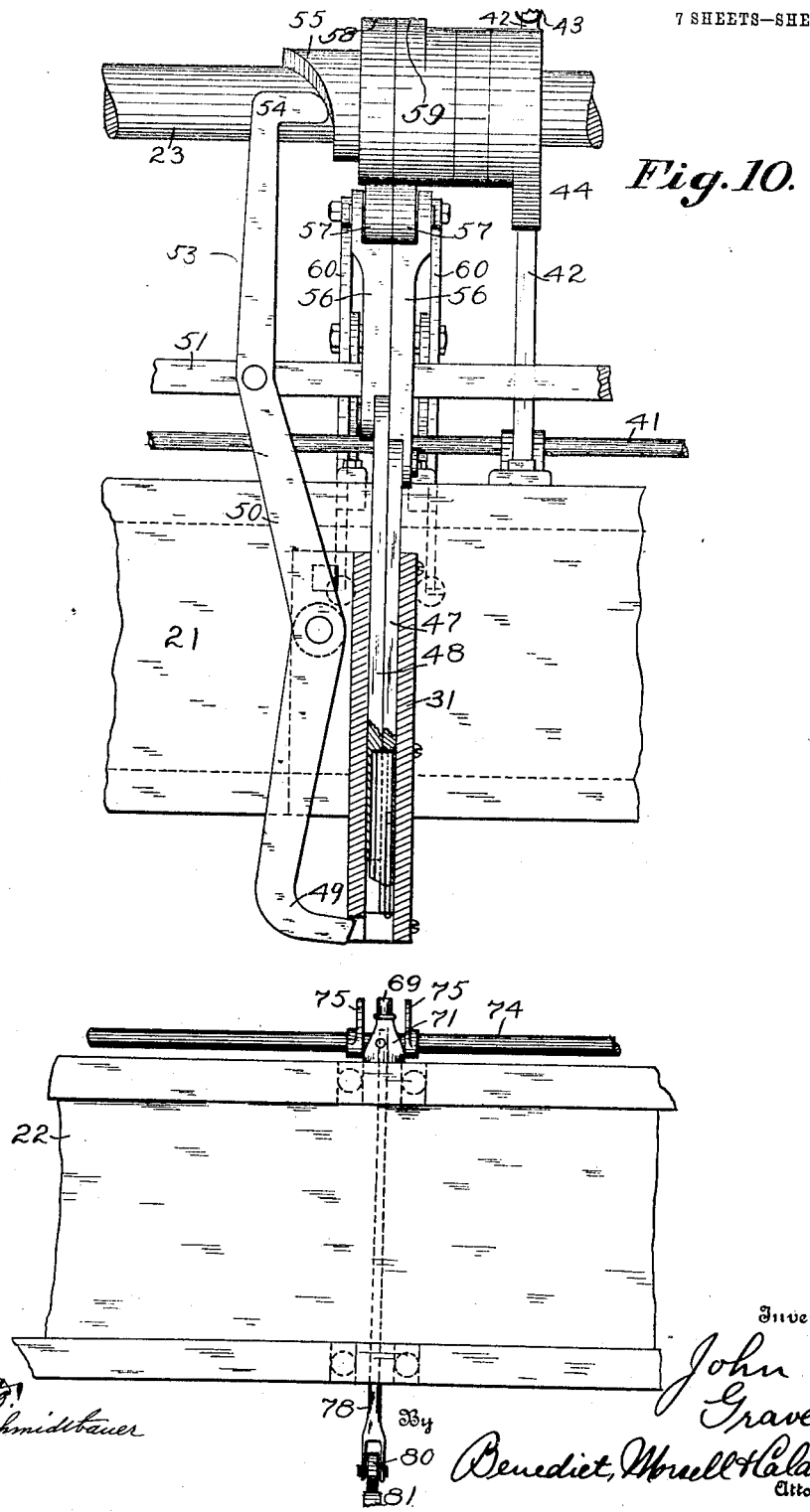

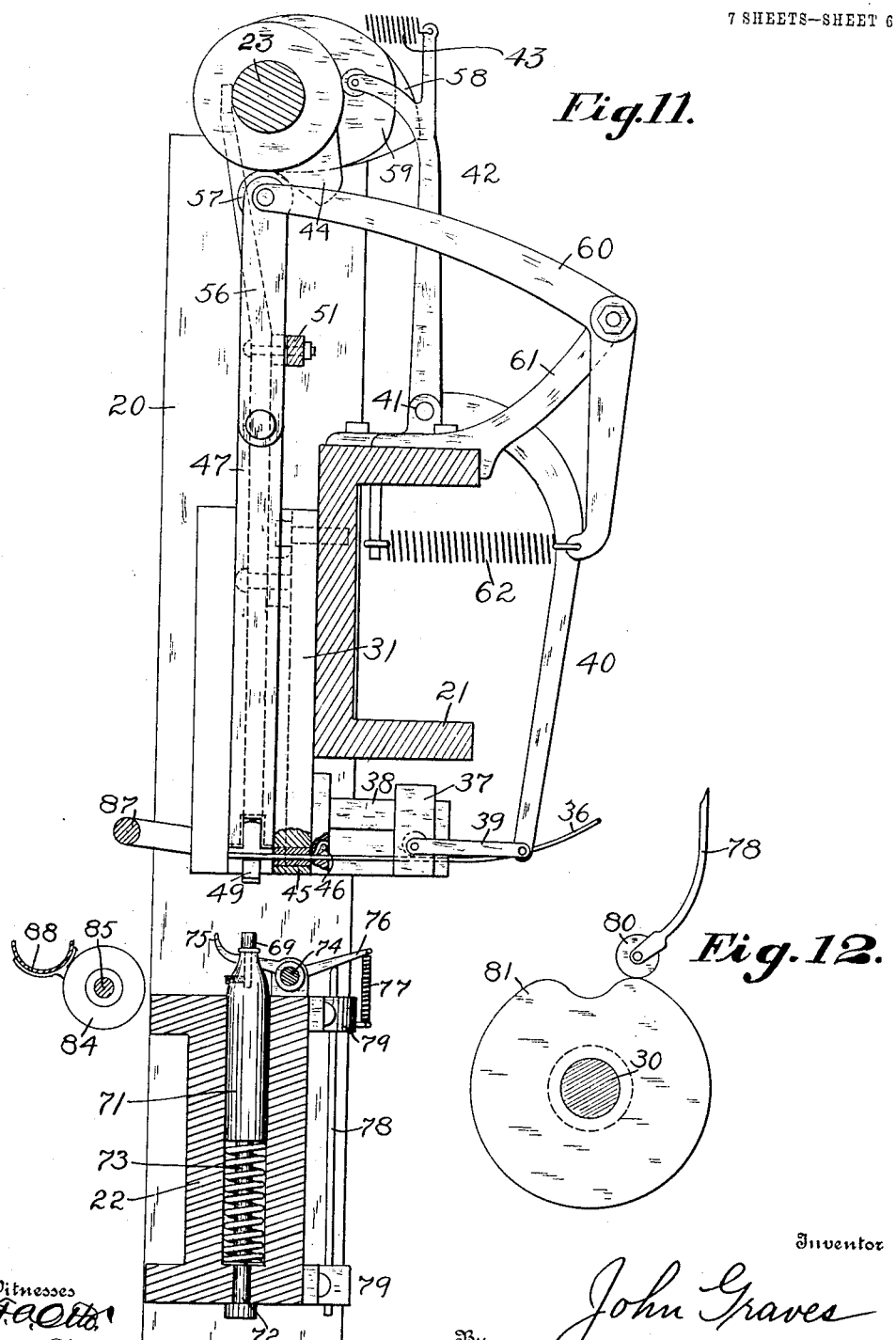

No. 892,827. PATENTED JULY 7, 1908.
J. GRAVES.
FLY NET MACHINE.
APPLICATION FILED OCT. 8, 1906.
7 SHEETS—SHEET 7.
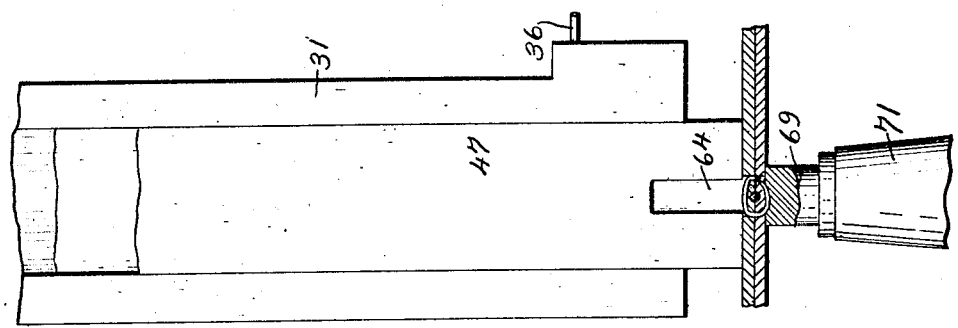
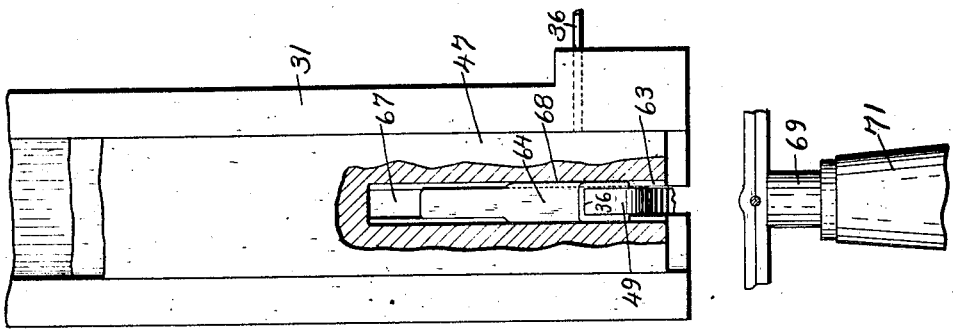
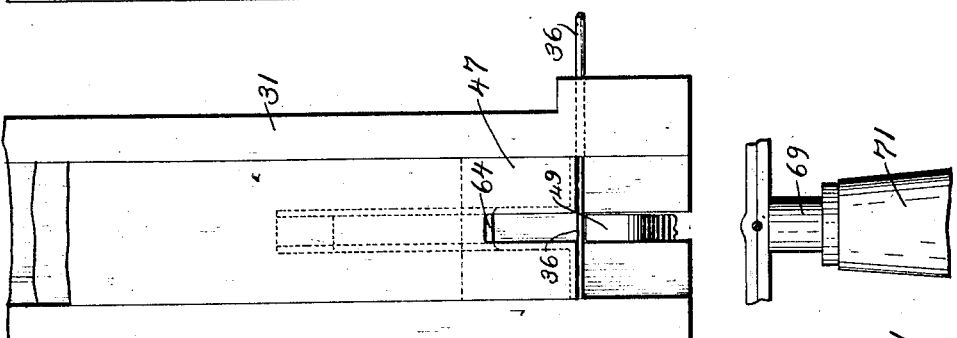
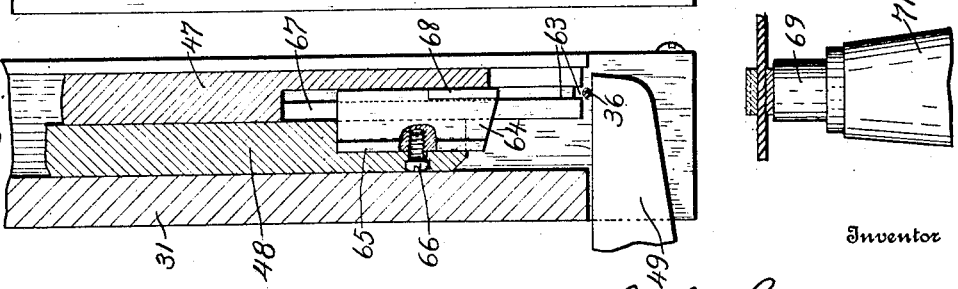
Witnesses
F. A. Otto
Anna F. Schmidtbauer
Inventor
John Graves.
By Benedict, Morsell & Caldwell
Attorneys

UNITED STATES PATENT OFFICE.

JOHN GRAVES, OF MILWAUKEE, WISCONSIN.

FLY-NET MACHINE.

No. 892,827.      Specification of Letters Patent.      Patented July 7, 1908.

Application filed October 8, 1906. Serial No. 337,914.

*To all whom it may concern:*

Be it known that I, JOHN GRAVES, residing in Milwaukee, in the county of Milwaukee and State of Wisconsin, have invented new and useful Improvements in Fly-Net Machines, of which the following is a description, reference being had to the accompanying drawings, which are a part of this specification.

This invention has for its object to provide a machine for producing fly nets, and comprises mechanism for feeding strips of material to produce the bars, and mechanism for securing the cords between said strips by automatic staple forming and clenching devices, and mechanism for timing the feeding mechanism to properly space the cords of each fly net and to produce the desired space between successive fly nets.

With the above and other objects in view the invention consists in the fly net machine herein claimed, its parts and combinations of parts and all equivalents.

Referring to the accompanying drawings in which like characters of reference indicate the same parts in the several views:—Figure 1 is a front elevation of a fly net machine constructed in accordance with this invention; Fig. 2 is an end elevation thereof; Fig. 3 is a detail view of the drum feeding clutch; Fig. 4 is a sectional view thereof on the plane of line 4—4 of Fig. 3; Fig. 5 is a perspective view of a fragment of a fly net produced on this machine; Fig. 6 is a perspective view of the reverse side thereof; Fig. 7 is a plan view of one of the stapling or clenching dies; Fig. 8 is a sectional elevation thereof; Fig. 9 is a side elevation of the fly net machine; Fig. 10 is an enlarged front elevation partly in section of the staple forming and clenching mechanism; Fig. 11 is a similar view thereof on a plane at right angles to the plane of Fig. 10; Fig. 12 is a detail view of the cord lifting cam; Fig. 13 is a sectional side elevation of the staple forming and clenching mechanism in position to begin its operation; Fig. 14 is a front elevation thereof; Fig. 15 is a similar view with parts broken away and in the position assumed by them when the staple has been formed and is ready to be inserted; and, Fig. 16 is a front elevation of the same parts in the position assumed by them when clenching the staple.

In these drawings 20 represents a pair of end frames which are connected near their upper ends by cross beams 21 and 22, the former being of a U-shape in cross section and the latter of an I-shape in cross section. A drive shaft 23 is journaled across the top of the machine and is connected by an automatic clutch 24 with a belt wheel 25 which is driven from any suitable source of power by a belt 26. At the other side of the machine is a vertically arranged shaft 27 which is connected by bevel gears 28 with the driving shaft 23 at its upper end and is connected by bevel gears 29 with a counter shaft 30 at its lower end, the counter shaft being journaled across the frame as clearly shown in Fig. 1.

A series of tubular casings 31 are formed on the cross beam 21 at regular distances, there being five as here shown, and in each of these is a stapling mechanism as shown in detail in Figs. 13 to 16. A pair of cross bars 32 are secured across the upper end of the machine, one in the front and the other in the back, as shown in Fig. 2, and a series of arms 33 are adjustably mounted on them and carry at their outer cranked ends suitable reels, the reels 34 at the front of the machine being adapted to contain strips of leather to form the upper part of the bars of the nets and the reels 35 at the back of the machine being adapted to contain wire 36 from which the staples are produced.

The end of the wire from each reel 35 is passed through a cam feed block 37, as shown in Fig. 11, which is slidably mounted on a guide 38 at the rear of the lower end of each tubular casing 31 and is connected by a link 39 with a crank 40 which is pivoted at 41 on top of the cross beam 21 and has its upwardly extending arm 42 drawn by a spring 43 against a cam 44 on the drive shaft 23, so that by each rotation of the drive shaft the feed block 37 is reciprocated to carry the end of the wire 36 in through a hardened steel wearing block 45 in one wall of the casing 31 and across the opening thereof to the other wall, the wire being then held by a gravity pawl 46 against withdrawal. The end of the wire 36 is caused to stand across the opening of the tubular casing 31 in the path of a double plunger or stapling head comprising a staple forming slide 47 and a staple forcing slide 48, there being a hook shaped former 49 projecting through an opening in the side of the casing 31 and adapted to stand beneath the end of the wire, as shown in Figs. 11, 13 and 14.

The hook shaped formers 49 constitute the ends of levers 50 which are pivoted to the cross beams 21 with their upper ends connected by a common bar 51 which is drawn by a spring 52 in a direction to hold the formers out of the casings 31, but an extension arm 53 on the middle lever 50 has a nose 54 at its upper end, as shown in Fig. 10, to ride on a cam 55 on the drive shaft 23 to swing this lever and the others, by means of their connection therewith, so as to force the formers into their operative positions in the tubular casings beneath the staple forming slides 47.

Each of the staple forming slides 47 and the staple forcing slides 48 has a link 56 pivoted to its upper end carrying a roller 57 riding on a cam on the operating shaft 23, the cam 58 for the staple forcing slide being of different formation from the cam 59 for the staple forming slide in order to produce different motions in these parts as later described. The links 56 are supported at their upper ends by being pivoted to the arms of bell crank levers 60 which are fulcrumed on brackets 61 extending from the cross beam 21 and have their lower ends connected with springs 62 which tend to lift the staple forming and forcing slides and hold the rollers 57 against the cams 58 and 59.

The staple forming slide 47 is bifurcated at its lower end to form a recess which will closely receive the end of the former 49, and the side walls of the recess and the bottoms of the furcate ends are provided with grooves 63 to receive the wire 36 during the formation of the staple and guide it in its descent when being applied to the material. As the staple forming slide 47 moves downwardly it cuts off the end of the wire at the end of the hardened block 45 and brings the cut length against the former 49 which holds the middle portion thereof while the ends are forced downwardly by means of the furcate ends of the staple forming slide 47, the wire length thus being bent to the form of a staple as shown in Fig. 15 with its downwardly extending legs located in the grooves 63 in the side walls of the recess of the staple forming slide.

The staple forcing slide 48 is grooved at its lower part to receive a forcing block or head 64 which has oppositely extending vertical flanges 65 fitting in undercut portions of the groove and is held in place by a clamping screw 66 through the end of slide 48. This staple forcing head 64 projects into the groove 67 in the staple forming slide 47 and has oppositely extending vertical flanges 68 riding in undercut portions of said groove forming continuations of grooves 63, the forcing head being slidable in the grooves 67 and caused to operate therein by the difference in formation of cams 58 and 59.

When the staple has been formed by the descent of the staple forming slide 47, as above mentioned, the forcing head 64 comes into engagement with it, and the former 49 is withdrawn by the action of the cam 55, so that the staple forming and forcing slides 47 and 48 may continue their downward movement together until the staple forming slide engages the material to be stapled which is located on an anvil 69 therebeneath. The staple forcing slide continues its downward movement causing the forcing head 64 to slide the staple 36' along the grooves 63 and into the material, the prongs of the staple after passing through the material being received in tapering recesses 70 in the face of the anvil which are arranged side by side and serve to clench the staple prongs by bending them toward each other so that their ends overlap, as shown in Fig. 6.

The anvils or die blocks 69 are mounted on plungers 71 which slide in vertical bores of the cross beam 22 with headed bolts 72 on their ends passing through contracted portions of the bores and having coil compression springs 73 surrounding them, the anvils thus being mounted to yield slightly under pressure. The springs 73 are sufficiently stiff to prevent the yielding of the anvils until the staples have been clenched and serve to return the anvils to their normal positions as determined by the engagement by the heads of the bolts 72 with the bottom of the cross beam 22.

A rock shaft 74 is journaled along the top of cross beam 22 close to the plungers 71 and has a series of upturned hook arms 75 mounted thereon and arranged on each side of the anvils 69. A rearwardly extending arm 76 on the rock shaft 74 is drawn downwardly by a coiled spring 77 and is engaged by a rod 78 which passes through guides 79 on the cross beam 22 and carries a roller 80 on its forked lower end which rides on a cam 81 on the countershaft 30, most clearly shown in Fig. 12.

A rod 82 connects the side frames 20 near their lower ends and serves as a support for a series of reels 83 similar to reels 34, and which are adapted to contain rolls of leather strips for the lower members of the fly net bars. A series of groove rollers 84 are mounted on a rod or shaft 85 which is supported by brackets 86 on the front of the cross beam 22, and the lines of leather strips from the reels 83 pass around the grooved rollers 84 and over the anvils 69. Corresponding to the grooved guide rollers 84 for the lower strips, a grooved roller or crank rod 87 extends across the frame above the rod 85 and serves to guide the strings of leather strips which run down from reels 34 so that they lie upon the lower strips of leather. The crank rod 87 has a crank arm 87' at its end riding in a grooved cam 87" on the vertical shaft 27 to cause the swing of said rod to bring the upper straps down against the lower straps after the cord has been fed therebetween.

A trough 88 is supported from the brackets 86 and serves to hold a supply of cords 89 of uniform length which are to be fed by hand from said trough to the opening between the upper and lower straps in front of the anvils 69. The operation of the rock shaft 74, caused by the roller 80 dropping into the notch in the surface of cam 81, causes the curved arms 75 to swing upwardly and engage the cord so placed and carry it into position on top of the anvils 69 where it will be received between the prongs of the staples when they are applied. In this manner the staples are caused to bind the leather strips together to form the bars with the cords secured between them and within the staples.

The finished material passes from between the anvils and the stapling heads rearwardly and is wound upon rubber faced rollers constituting a drum 90 which is journaled in the rear of the frame and is caused to rotate to wind up the net and feed the leather strips between each pair of cords by a clutch mechanism, shown in Figs. 3 and 4, operated from a cam 91 on counter shaft 30. This cam has a deep recess in its edge as shown by dotted lines in Fig. 2 which allows a spring 92 to swing the roller end of a bell crank lever 93 downwardly at each revolution of the shaft 30. The extent of this movement is limited by a pin 94, on the upwardly extending arm of the bell crank lever 93, striking against the periphery of a disk 95 which is journaled on the frame and is driven by a train of gears 96 from a worm 97 on the vertical shaft 27. The disk 95 has a notch 98 in its periphery to allow the bell crank lever 93 to swing to a greater extent when this notch is in position to receive the pin 94, which will occur once in each revolution of the disk. The amount of swing given to the bell crank lever 93 may be regulated by changing the position of a plate 99 on the bell crank lever which carries the pin 94, said plate being pivotally mounted and having an arc shaped slotted portion at the upper end riding on a set bolt 100 on the lever, there being an index marked on the arc shaped portion to indicate by means of a pin 101 on the bell crank lever the extent of throw of said bell crank lever.

The upper end of the bell crank lever is connected by a rod 102 with a lever 103 loosely mounted on the shaft of drum 90, on which is fixed a clutch wheel 104 having a flanged periphery passing through a slot in the side of a clutch member 105 which is pivoted at its lower end to a link 106 pivotally suspended on the pivotal boss of lever 103, there being a pin or lug 107 on the lower end of lever 103 which engages the upper end of the clutch member and is pressed upon by an adjustable coil spring 108 carried by a bracket 109 on the link 106. The pressure of the spring 108 tends to force the lug 107 against the upper end of the clutch member to cause it to swing to the right, as shown in Fig. 3 and thus bind its groove on the rim of the clutch wheel. This is the normal condition when the parts are at rest and when the lever 103 is turning in the direction of the arrow in Fig. 3, but when the lever is turning in the other direction the pin 107 is forced back against the spring 108 to relieve the pressure on the upper end of the clutch member and said clutch member is free to slide on the flange of the clutch wheel to take up a new position. Thus, when the lever 103 is swung by the roller on bell crank lever 93 dropping into the recess of cam 91, the clutch is moved to take a new position on the clutch wheel, and as the bell crank lever 93 is forced out of the recess by the turning of cam 91, the clutch is caused to rotate the clutch wheel to an extent determined by the throw of lever 93 for which the pin 94 is adjusted. The turning of clutch wheel 94 causes the drum 90 to turn and wind up the finished fly net, so as to feed the straps forming the bars the distance required for the space between successive cords. A greater feed is produced when the pin 94 passes into the notch 98 of disk 95 to cause a larger space between one pair of cords to indicate the termination of one fly net and the beginning of another, the bars being later cut between these greater-spaced cords to separate the fly nets which are turned out by the machine in a continuous length. There are as many rollers forming the feeding drum 90 as there are bars to the net, usually five, and each is provided with a bearing roller 110 mounted on a lever 111 which carries a weight 112 and is pivoted to standards 113. The bearing rollers hold the bars tightly against the rubber faced rollers of drum 90 and prevent their slippage.

The operation of the machine has been incidentally mentioned in detail in connection with the description of the various parts so that it will be understood that an engagement of the clutch 24 by the pressure of the foot upon a treadle 114 which is connected therewith by a spring pressed rod 115 will cause one revolution of the operating shaft 23. This is sufficient to produce a complete movement of the material feeding drum 90 to draw the leather straps the distance between cords, the cam 81 causes the arm 75 to swing the cord placed thereon by the operator onto the anvils 69 between the upper and lower straps, the grooved cam 87'' causes the rod 87 to swing and bring the upper straps down to the lower straps, a complete cycle of operation of the stapling heads is made to form the staples and force them through the assembled straps and cord and clench them underneath, and the parts resume their starting condition when the clutch 24 automatically disconnects from the drive wheel until another cord has been fed and the treadle 14 operated again, this cycle of operation being repeated indefinitely.

What I claim as my invention is:

1. In a machine for making fly nets, mechanism for supplying a plurality of pairs of straps with cords therebetween, and a plurality of stapling heads for forming and placing staples at the junction of the straps and cords.

2. In a fly net machine, a frame, a shaft journaled thereon, pairs of cams carried by the shaft, stapling heads each comprising a casing with a staple forming slide and a staple forcing slide movable therein, links connected with the staple forming slide and the staple forcing slide respectively, rollers carried by the links, spring pressed bell crank levers mounted on the frame and connected to the ends of the links for holding the rollers thereof in engagement with the cams, hook shaped formers pivoted on the frame and adapted to move into the path of the staple forming slides, a nose formed on the end of one former, a spring actuated bar connecting the formers together, a cam on the shaft for engaging the nose and forcing the formers to move, and anvils on the frame in the path of the stapling heads.

3. In a fly net machine, a frame, a stapling head thereon, an anvil on the frame in the path of the stapling head, a rock shaft journaled on the frame, arms thereon embracing the anvil, a spring actuated crank arm on the rock shaft, a rod slidable in the frame and engaging the crank arm, a roller carried by the rod, a suitably driven shaft mounted on the frame, and a cam on the shaft for engaging the roller and causing the rock shaft to swing and lift the material onto the anvils by means of the arms.

4. In a fly net machine, a frame, a stapling head mounted on the frame, anvils on the frame in the path of the stapling head, reels mounted on the frame for supplying upper and lower strips to constitute bars, a guide roller around which the lower strips pass before passing over the anvil, a crank rod mounted in the frame and constituting a guide for the upper strips before they pass over the anvil, a crank pin on the crank rod, a suitably driven shaft, and a cam on the shaft for operating the crank pin and causing the crank rod to swing and bring the strips together during the stapling operation.

5. In a fly net machine, a frame, stapling heads mounted on the frame, anvils on the frame in the path of the stapling heads, reels mounted on the frame for supplying upper and lower strips to constitute bars, brackets on the frame, a shaft journaled in the brackets, grooved rollers on the shaft for guiding the lower strips, to the anvils, a trough carried by the brackets for supporting a supply of cords, a crank rod mounted in the frame, a grooved roller thereon for guiding the upper strips to the anvils, a crank pin on the crank rod, a suitably operated shaft, and a cam thereon for engaging the crank pin and causing the crank rod to swing and bring the upper strips against the lower strips during the stapling operation.

6. In a fly net machine, a frame, a series of stapling heads mounted thereon, operating mechanism for the stapling heads, a drum for receiving the finished material from the stapling heads, and means for feeding the drum intermittently to space the cords of the fly net apart, comprising a disk connected with the drum, a lever constituting a clutch for engaging the disk, a bell crank lever connected with said lever, a cam driven by the operating mechanism and engaging the bell crank lever for causing it to swing and operate the drum, a pin carried by the bell crank lever, and a notched disk in the path of the pin and geared with the operating mechanism for determining the space between the cords of the fly net, the notch serving to receive the pin and produce a greater spacing between the cords of successive fly nets.

7. In a fly net machine, a frame, a series of stapling heads mounted thereon, an operating mechanism for the stapling heads, a drum for receiving the finished material from the stapling heads, and means for feeding the drum intermittently to space the cords of the fly net apart, comprising a disk connected with the drum, a lever constituting a clutch for engaging the disk, a bell crank lever connected with said lever, a cam driven by the operating mechanism and engaging the bell crank lever for causing it to swing and operate the drum, a pin carried by the bell crank lever, a notched disk in the path of the pin and geared with the operating mechanism for determining the space between the cords of the fly net, the notch serving to receive the pin and produce a greater spacing between the cords of successive fly nets, and means for adjusting the pin to vary the space between the cords of the fly nets.

8. In a fly net machine, a frame, a series of stapling heads mounted thereon, an operating mechanism for the stapling heads, a drum for receiving the finished material from the stapling heads, and means for feeding the drum intermittently to space the cords of the fly net apart, comprising a disk connected with the drum, a lever constituting a clutch for engaging the disk, a bell crank lever connected with said lever, a cam driven by the operating mechanism and engaging the bell crank lever for causing it to swing and operate the drum, a pin carried by the bell crank lever, a notched disk in the path of the pin and geared with the operating mechanism for determining the space between the cords of the fly net, the notch serving to receive the pin and produce a greater spacing between the cords of successive fly nets, a plate pivotally mounted on the bell crank lever and carrying the pin, said plate having an arc shaped slot, and a bolt on the bell crank lever passing through the arc shaped slot of the plate for locking the plate in its various adjustments and determining the position of the pin.

9. In a fly net machine, a frame, a series of stapling heads mounted thereon, operating mechanism for the stapling heads, a drum for receiving the finished material from the stapling heads, and means for feeding the drum intermittently to space cords of the fly net apart, comprising a disk connected with the drum, a lever constituting a clutch for engaging the disk, a spring actuated bell crank lever connected with said lever, a worm driven by the operating mechanism, a train of gears connected therewith, a notched disk driven by the train of gears, a plate pivotally mounted on the bell crank lever and adjustable thereon, a pin carried by the plate for engaging the notched disk and determining the space between the cords of the fly net, said drum comprising a series of rubber faced rollers, and weighted pressure rollers bearing on the drum rollers to prevent the material slipping on the drum.

In testimony whereof I affix my signature, in presence of two witnesses.

JOHN GRAVES.

Witnesses:
R. S. C. CALDWELL,
ANNA F. SCHMIDTBAUER.